(12) United States Patent
Le et al.

(10) Patent No.: US 7,386,384 B2
(45) Date of Patent: Jun. 10, 2008

(54) SYSTEM AND METHOD FOR PREDICTING A VEHICLE ROLLOVER

(75) Inventors: Jerry Jialiang Le, Canton, MI (US); Robert McCoy, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 622 days.

(21) Appl. No.: 10/907,626

(22) Filed: Apr. 8, 2005

(65) Prior Publication Data

US 2006/0229790 A1    Oct. 12, 2006

(51) Int. Cl.
*B60R 22/00* (2006.01)
*G06F 19/00* (2006.01)

(52) U.S. Cl. .................. 701/70; 701/45; 701/301; 280/735; 180/282

(58) Field of Classification Search .................. 701/70, 701/45, 46, 47, 301; 280/735, 755, 5.508; 180/282; 340/429, 440
See application file for complete search history.

(56) References Cited

U.S. PATENT DOCUMENTS

| | | | |
|---|---|---|---|
| 6,104,284 A | 8/2000 | Otsuka | |
| 6,192,305 B1 | 2/2001 | Schiffmann | |
| 6,282,474 B1 | 8/2001 | Chou et al. | |
| 6,301,536 B1 | 10/2001 | Vaessen et al. | |
| 6,714,848 B2 | 3/2004 | Schubert et al. | |
| 2002/0145333 A1 | 10/2002 | Faye | |
| 2003/0047927 A1 | 3/2003 | Frimberger et al. | |
| 2003/0182041 A1* | 9/2003 | Watson | 701/45 |
| 2004/0254710 A1* | 12/2004 | Yano | 701/70 |
| 2005/0230176 A1* | 10/2005 | Wang | 180/282 |

OTHER PUBLICATIONS

A New Sensing Concept for Tripped Rollovers, M. Kroninger, R. Lahmann, T. Lich, M. Schmid, H. Guttler, and T. Huber, SAE Technical Paper Series (2004-01-0340) SAE International Wold Congress, Detroit, MI Mar. 8-11, 2004.

* cited by examiner

*Primary Examiner*—Tan Q Nguyen
(74) *Attorney, Agent, or Firm*—Frank A. MacKenzie; Brooks Kushman P.C.

(57) ABSTRACT

A system and method for predicting a vehicle rollover. A vehicle rollover is predicted when a vehicle impact has not occurred and first and second threshold values indicative of vehicle motion and vehicle kinetic energy are exceeded.

20 Claims, 2 Drawing Sheets

SYSTEM AND METHOD FOR PREDICTING A VEHICLE ROLLOVER

BACKGROUND OF THE INVENTION

1. Field of the Invention

The present invention relates to a system and method for determining vehicle instability, and more specifically to a system and method for predicting when vehicle rollover may occur.

2. Background Art

Motor vehicles may be equipped with a rollover sensing system, such as that described in U.S. Pat. No. 6,282,474, assigned to the assignee of the present invention. Previous rollover sensing systems did not distinguish between conditions indicative of a vehicle rollover and conditions indicative of a vehicle impact event. As a result, prior rollover sensing systems may interpret the forces associated with a vehicle impact event as being indicative of a vehicle rollover even when a rollover is unlikely to occur.

Before Applicants' invention, there was a need for an improved system and method of assessing vehicle instability and conditions indicative of a vehicle rollover. In addition, there was a need for a system and method that could distinguish between a vehicle impact event and situations in which a rollover is likely to occur. In addition, there was a need for a system and method that could accurately predict a vehicle rollover so that appropriate corrective and/or protective actions could be taken. In addition, there was a need for a system and method that could be implemented without the need for specialized sensors or other equipment. In addition, there was a need for a system and method that could be implemented in a high volume mass production operation, such as motor vehicle production. Problems associated with the prior art as noted above and other problems are addressed by Applicants' invention as summarized below.

SUMMARY OF THE INVENTION

According to one aspect of the present invention, a method of predicting a vehicle rollover is provided. The method includes the steps of determining a vehicle roll angle, determining whether a vehicle impact event has occurred, selecting first and second threshold values, comparing a first signal indicative of motion of the vehicle to the first threshold value, and comparing a second signal indicative of kinetic energy of the vehicle to a second threshold value. A vehicle rollover is predicted when a vehicle impact does not occur and the first and second signals exceed the first and second threshold values, respectively.

The method may include the step of controlling a vehicle safety system when a vehicle rollover is predicted. The vehicle safety system may be an air bag, an inflatable knee bolster, or a seat belt pretensioner.

The step of selecting the first threshold value may be based on the roll angle and the roll rate of a vehicle. The step of selecting the second threshold value may be based on velocity or acceleration of the vehicle in the direction of roll.

The step of determining whether a vehicle impact has occurred may include determining whether pressure detected by an impact sensor exceeds a predetermined pressure value, determining whether acceleration in the direction of roll exceeds a predetermined acceleration value, or determining whether velocity in the direction of roll exceeds a predetermined velocity value.

According to another aspect of the present invention, a method of predicting a rollover of a motor vehicle is provided. The vehicle includes at least one sensor adapted to detect lateral acceleration and a roll rate of the vehicle. The method includes the steps of determining a first value indicative of a vehicle roll rate and a second value indicative of lateral acceleration of the vehicle, determining whether the first and second values are within predetermined ranges, determining a vehicle roll angle based on the first value when the first and second values are not within the predetermined ranges, selecting a first threshold value based on the vehicle roll angle, determining whether a vehicle impact has occurred, selecting a second threshold value if a vehicle impact has not occurred, comparing a first signal indicative of motion of the vehicle to the first threshold value, and comparing a second signal indicative of kinetic energy to a second threshold value. A rollover is predicted when a vehicle impact has not occurred and the first and second signals exceed the first and second threshold values, respectively.

The step of determining whether a vehicle impact has occurred may include determining whether the lateral acceleration exceeds a predetermined lateral acceleration value, determining whether the longitudinal acceleration in a direction perpendicular to the lateral acceleration exceeds a predetermined longitudinal acceleration value, or determining whether pressure detected by an impact sensor exceeds a predetermined pressure value.

According to another aspect of the present invention, a system for predicting a roll condition of a motor vehicle is provided. The system includes a first sensor, a second sensor, a third sensor, and a controller. The first sensor generates a roll angle signal, the second sensor generates a lateral acceleration signal, the third sensor generates a longitudinal acceleration signal. The controller is configured to receive signals from the first, second, and third sensors. The controller selects a first threshold value based on the roll angle signal and selects a second threshold value based on the lateral or longitudinal acceleration signals. The controller indicates a roll condition when the lateral and longitudinal acceleration signals do not indicate a vehicle impact and the lateral acceleration signal exceeds the first and second threshold values.

The roll angle sensor may include a roll rate sensor from which the roll angle signal is derived.

The vehicle may include a fourth sensor for providing a vertical acceleration signal to the controller. The controller may confirm the roll condition based on the vertical acceleration signal.

DETAILED DESCRIPTION OF THE PREFERRED EMBODIMENT(S)

Figure 1:
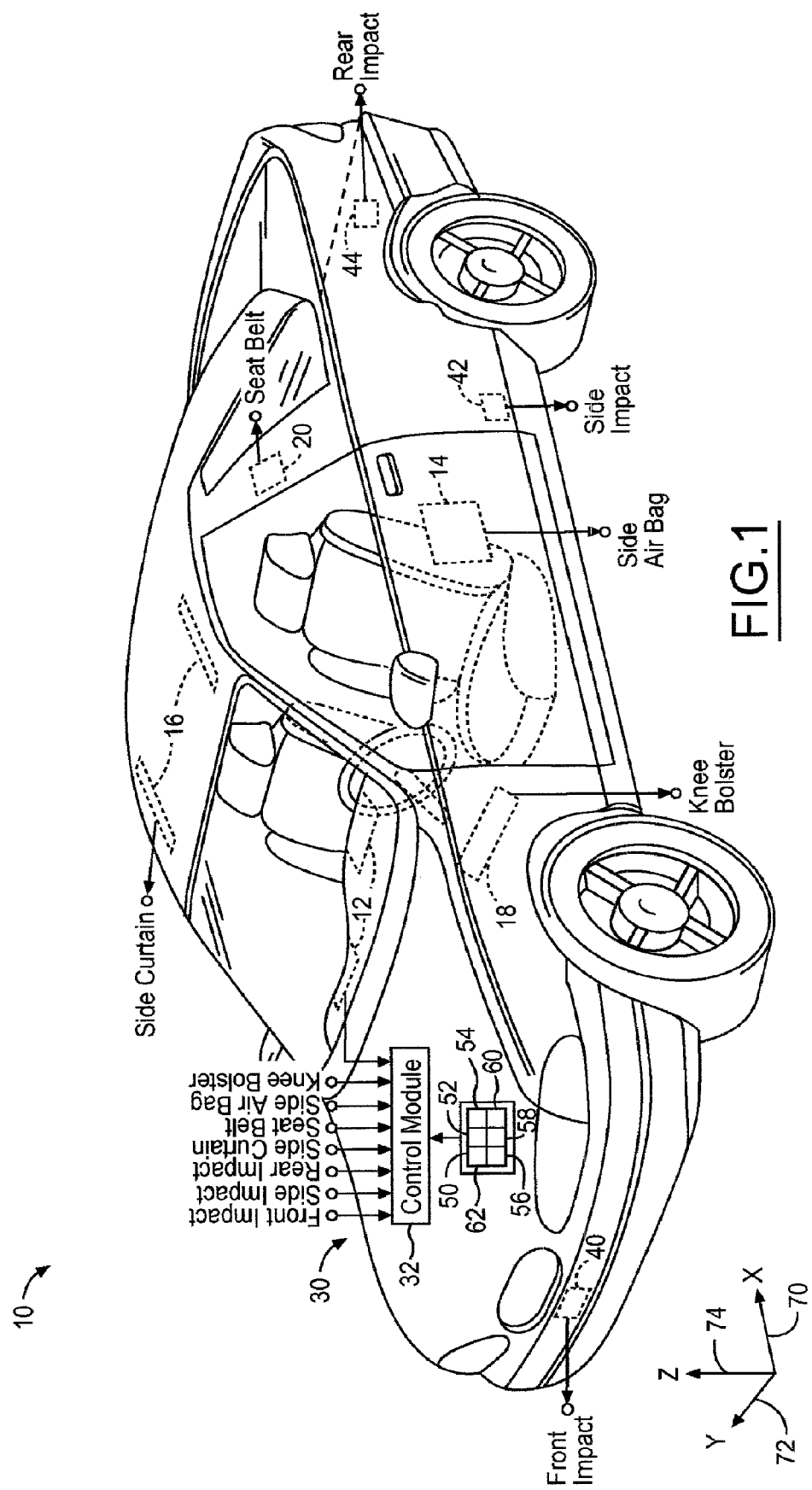
FIG. 1 is a side view of a vehicle having a rollover sensing system in accordance with one embodiment of the present invention.

Referring to FIG. 1, a schematic of a vehicle 10 is shown. The vehicle 10 may be of any suitable type, such as a car or truck.

The vehicle 10 may include one or more vehicle safety systems, which may include occupant protection devices such as one or more front air bags 12, side air bags 14, side curtain air bags 16, inflatable knee bolsters 18, and/or seat belt modules 20 that may include a pretensioner, retractor mechanism, and/or adaptive seat belt system that actuates, constrains, and/or adjusts movement of a seat belt.

The vehicle 10 also includes a rollover sensing system 30. The rollover sensing system 30 may include a control circuit associated with one or more control modules 32. The control module 32 is configured to monitor and/or control the operation of various vehicle components and subsystems. For example, one or more control modules 32 may control or communicate with components that control operation of one or more occupant protection systems.

The control module 32 may communicate with or receive signals from one or more sensors or sensor modules. For example, the control module 32 may receive signals from one or more vehicle impact sensors, such as a front impact sensor 40, a side impact sensor 42, and/or a rear impact sensor 44. The impact sensors may be of any suitable type and may be disposed in any suitable location. For instance, the front impact sensor 40 may be disposed near a front portion of the vehicle 10, such as the radiator support. The side impact sensor 42 may be disposed near a side of the vehicle 10, such as proximate a body pillar or vehicle door. The rear impact sensor 44 may be disposed near a rear portion of the vehicle 10. The impact sensors may be adapted to monitor and detect acceleration forces that occur during a vehicle impact event. In addition, one or more impact sensors, such as the side impact sensor 42, may be adapted to detect load forces or pressure associated with a vehicle impact event.

The control module 32 may also receive signals from one or more vehicle dynamics sensors. The vehicle dynamics sensors may be configured to detect translation and/or rotation of the vehicle 10 in a predetermined direction. In the embodiment shown, the vehicle 10 includes first, second, and third translation sensors 50,52,54 and first, second, and third rotation sensors 56,58,60. The translation and rotation sensors 50,52,54,56,58,60 may be spaced apart or combined in various combinations into one or more assemblies. In the embodiment shown in FIG. 1, the sensors 50,52,54,56,58,60 are integrated into a module 62. Such a module may be disposed in any suitable location. For instance, the module 62 may be disposed near the geometric center or center of mass of the vehicle 10.

The translation sensors 50,52,54 are adapted to detect movement along first, second, and third axes 70,72,74, respectively. The translation sensors 50,52,54 may have any suitable configuration. For example, the translation sensors 50,52,54 may be accelerometers that generate a signal indicative of acceleration or movement along an associated axis. For instance, the first translation sensor 50 may detect longitudinal acceleration along the X axis while the second translation sensor 52 may detect lateral acceleration along the Y axis. The translation sensors 50,52,54 may be of any suitable type, such as piezoeletric, piezo resistive, solid state, capacitive, or silicon micromachined devices.

The rotation sensors 56,58,60 are adapted to detect rotation about the first, second, and third axes 70,72,74, respectively. More particularly, the rotation sensors 56,58,60 may be adapted to detect a roll angle and/or roll rate about an associated axis. The rotation sensors 56,58,60 may also be of any suitable type.

The first, second, and third axes 70,72,74 may have any suitable orientation. The first or X-axis 70 is oriented in a direction extending between the front and back of the vehicle 10. The second or Y-axis 72 is disposed perpendicular to the first or X-axis 70 and extends laterally or between the left and right sides of the vehicle 10. The third or Z-axis 74 is disposed perpendicular to the first (X) and second (Y) axes 70,72 and extends in a generally vertical direction when the vehicle 10 is disposed on a horizontal surface.

Figure 2:
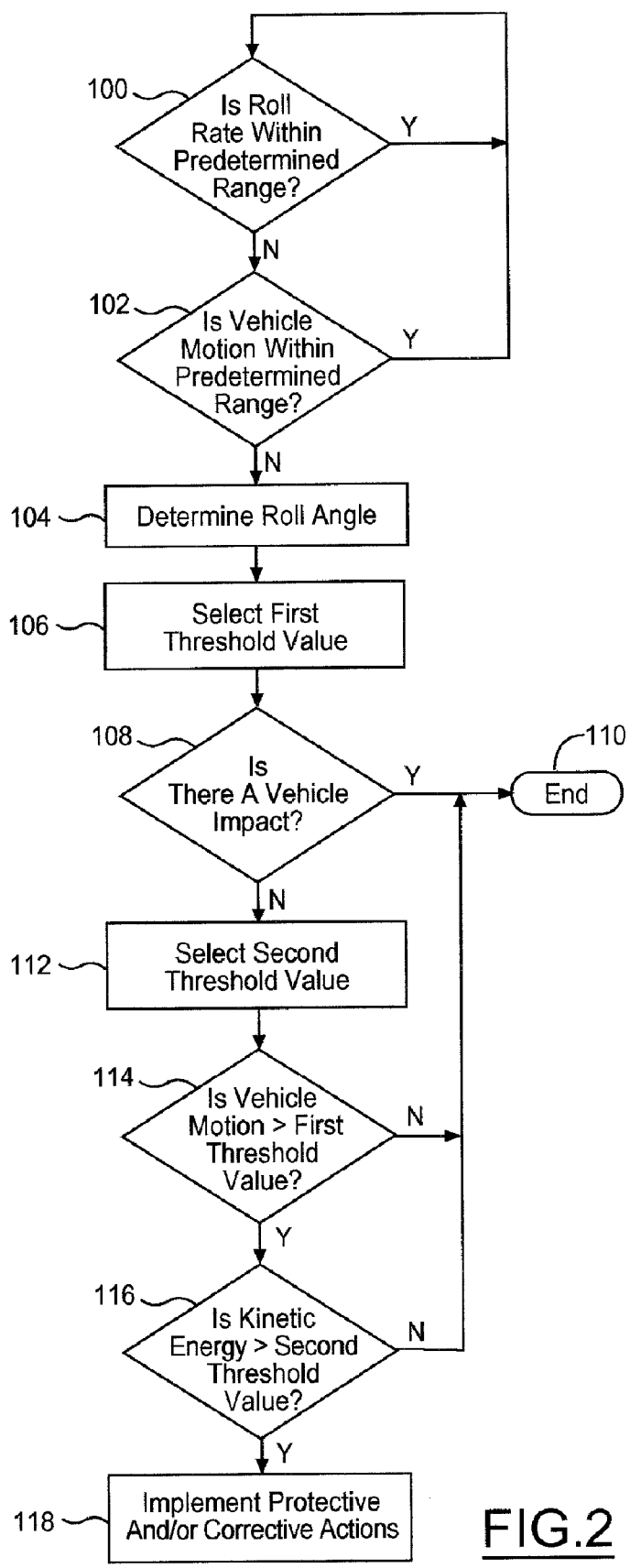
FIG. 2 shows a flowchart of one embodiment of a method for predicting a vehicle rollover event.

Referring to FIG. 2, a flowchart of a method for predicting a potential vehicle rollover is shown. As will be appreciated by one of ordinary skill in the art, the flowchart represents control logic which may be implemented using hardware, software, or combination of hardware and software. For example, the various functions may be performed using a programmed microprocessor. The control logic may be implemented using any of a number of known programming or processing techniques or strategies and is not limited to the order or sequence illustrated. For instance, interrupt or event-driven processing may be employed in real-time control applications, rather than a purely sequential strategy as illustrated. Likewise, pair processing, multitasking, or multithreaded systems and methods may be used to accomplish the objectives, features, and advantages of the present invention.

This invention is independent of the particular programming language, operating system processor, or circuitry used to develop and/or implement the control logic illustrated. Likewise, depending upon the particular programming language and processing strategy, various functions may be performed in the sequence illustrated at substantially the same time or in a different sequence while accomplishing the features and advantages of the present invention. The illustrated functions may be modified or in some cases omitted without departing from the spirit or scope of the present invention.

The method is described below primarily with reference to an exemplary situation in which a vehicle rotates about its X axis (i.e., a potential side rollover situation). However, this invention contemplates scenarios in which a vehicle rotates about other axes or combinations of axes.

For a vehicle disposed on a inclined surface, a lower amount of force in the direction of inclination is needed to cause a vehicle rollover as compared to a vehicle disposed on a generally horizontal surface. Moreover, vehicle occupants may move out of position faster when a vehicle is disposed on an inclined surface. As a result, the time available to activate one or more occupant protection devices is reduced. The present invention predicts vehicle rollover conditions faster than previous algorithms, thereby yielding more time to activate an occupant protection device or take corrective actions. In addition, the method of the present invention distinguishes between potential rollover situations and vehicle impact events or collision situations. As such, corrective and protective actions suited for a rollover situation may be implemented when a rollover is detected.

At 100, the method begins by assessing the vehicle roll rate about one or more axes. The roll rate about one or more axes may be provided by one or more rotation sensors 56,58,60 as discussed above. Roll rates with high magnitudes may indicate an increased likelihood of a vehicle rollover. However, high roll rate magnitudes are not dispositive since similar roll rates may also occur during a vehicle impact event, such as a front, rear, side, or offset collision. The roll rate is compared to a predetermined value or predetermined range. If the roll rate is within the predetermined range (or does not exceed a predetermined value), then the method returns to block 100. If the roll rate is not within the predetermined range (or exceeds a predetermined value), then the method continues at 102.

At 102, the motion of the vehicle in the direction of inclination is assessed. The motion of the vehicle along one or more axes may be provided by one or more translation sensors 50,52,54 as discussed above. Acceleration or velocity in the direction of inclination may indicate an increased likelihood of a vehicle rollover. The vehicle motion (e.g., acceleration or velocity) is compared to a predetermined value or predetermined range. If the vehicle motion is within a predetermined range (or does not exceed a predetermined value), then the method returns to block 100. If the vehicle motion is not within the predetermined range (or exceeds a predetermined value), then the method continues at 104.

At 104, the roll angle of the vehicle along one or more axes is determined. The vehicle roll angle is indicative of the inclination of the vehicle relative to a horizontal plane along one or more axes. Higher roll angles may be indicative of an increased likelihood of a vehicle rollover as previously discussed. The roll angle may be measured directly or may based on the roll rate. For instance, a roll rate signal provided by one or more rotation sensors 56,58,60 may be integrated to provide an approximation of the roll angle. Since the roll rate is likely to change over time, the last roll rate value sampled before the predetermined ranges in blocks 100 and 102 were exceeded may be used in roll angle calculations.

At 106, a first threshold value is selected. Selection of the first threshold value may be based on various vehicle attributes, including the roll angle, vehicle speed, yaw rate, or combinations thereof. The first threshold value may be selected from a set of preprogrammed threshold values. For instance, a set of preprogrammed threshold values may be stored in a lookup table or in any other suitable manner. These preprogrammed threshold values may be associated with particular roll angle, vehicle speed, and/or yaw rate (e.g., rotation about the Z axis) or ranges of these attributes. For instance, a first subset of threshold values may be associated with roll angles of 0° to 10°, a second subset may be associated with roll angles of 11° to 20°, a third subset may be associated with roll angles of 21° to 30° and so on. Of course, any suitable number of subsets may be employed. In this way, the propensity for a vehicle rollover at various roll angles may be quickly summarized without the need for complex calculations. More particularly, by quantifying the expected behavior of a vehicle at various inclination angles, speeds, or yaw rates, complex, computationally intensive, and time consuming predictions of vehicle dynamics do not need to be executed in real time to accurately access potential rollover situations. As a result, prediction times are reduced, allowing more time to implement corrective or protective actions as compared to prior methodologies. The threshold values may be developed based on vehicle modeling or development testing.

At 108, the method determines if a vehicle impact has occurred. More particularly, the method distinguishes between vehicle impact events and vehicle rollover situations. An vehicle impact event may be distinguished from a rollover in various ways. For example, the forces transmitted to the vehicle during a vehicle impact event may be much greater than the forces associated with a vehicle rollover. Consequently, attributes such as pressure, acceleration, and/or velocity along one or more axes may be used to indicate a vehicle impact. Pressure, acceleration, and velocity values may be provided by the impact, translation, and rotation sensors as previously discussed. If a vehicle impact is detected, then the method ends at block 110. If a vehicle impact is not detected, then the method continues at block 112.

At 112, a second threshold value is selected. The second threshold value may be based on one or more attributes, such as the roll rate, roll angle, velocity in the direction of roll, and/or acceleration in the direction of roll. A second set of threshold values may be associated with one or more of these attributes, similar to the subsets described above in association with block 106. In addition, these threshold values may be preprogrammed to reduce prediction times as described above in block 106.

At 114, one or more attributes indicative of the motion of the vehicle are compared to the first threshold value. The vehicle motion may be based on an acceleration or velocity of the vehicle in the direction of inclination or direction of roll. For instance, if the vehicle is inclined to the left or right (i.e., rotated about the X axis), then lateral acceleration (along the Y axis) in the direction of inclination increases the likelihood of a vehicle rollover. If the level of vehicle motion does not exceed the first threshold value, then the method ends at block 110. If the vehicle motion is greater than the first threshold value, then the method continues at block 116.

At 116, a vehicle roll energy value is compared to the second threshold value. The vehicle roll energy value is indicative of the kinetic energy of the vehicle. As such the vehicle roll energy may be based on signals from the translation and/or rotational sensors. If velocity values are employed, they may be based on linear and/or angular acceleration values. For instance, linear or angular acceleration detected by one or more sensors may be integrated to yield linear and angular velocity values. If the vehicle roll energy value is not greater than the second threshold value, then the method ends at block 110. If the vehicle roll energy is greater than the second threshold value, then the method continues at block 118.

At 118, protective and/or corrective actions are implemented to mitigate a vehicle rollover and/or protect vehicle occupants. Protective actions may include operating or deploying one or more vehicle safety systems, such as the air bags, inflatable knee bolster, and/or seat belt systems previously described. Corrective actions may include controlling operation of the braking system or powertrain to reduce the speed of the vehicle to reduce the likelihood or potential severity of a rollover event.

In addition, the implementation of corrective and/or protective actions may be accompanied by a verification sequence or "safing" check. For instance, the method may compare the vertical acceleration along the Z axis to a threshold value to confirm that a vehicle rollover is occurring (i.e., significant Z axis acceleration does not usually occur in the absence of a rollover event). If the Z axis acceleration does not exceed the threshold value, then the protective and/or corrective actions are aborted. If the threshold value is exceeded, then the corrective and/or protective actions are allowed to proceed.

The method of the present invention may be employed for rollover events in which the vehicle is "tripped" (e.g., the vehicle contacts a raised surface, such as a curb, or digs into the ground) as well as rollover situations in which the vehicle is not tripped.

While the best mode for carrying out the invention has been described in detail, those familiar with the art to which this invention relates will recognize various alternative designs and embodiments for practicing the invention as defined by the following claims.

What is claimed is:

1. A method of predicting a rollover of a vehicle, the method comprising:

determining a vehicle roll angle indicative of a direction of roll;
determining whether a vehicle impact event has occurred;
selecting a first threshold value based on the roll angle and selecting a second threshold value that is based on motion of the vehicle in the direction of roll;
comparing a first signal indicative of motion of the vehicle to the first threshold value; and
comparing a second signal indicative of kinetic energy of the vehicle to a second threshold value;
wherein a vehicle rollover is predicted when a vehicle impact has not occurred and the first and second signals exceed the first and second threshold values, respectively.

2. The method of claim 1 further comprising the step of controlling a vehicle safety system when a vehicle rollover is predicted.

3. The method of claim 1 wherein the vehicle safety system comprises an air bag.

4. The method of claim 1 wherein the vehicle safety system comprises an inflatable knee bolster.

5. The method of claim 1 wherein the vehicle safety system comprises a seat belt pretensioner.

6. The method of claim 1 wherein the vehicle further comprises an impact sensor and the step of determining whether a vehicle impact has occurred further comprises determining whether pressure detected by the impact sensor exceeds a predetermined pressure value.

7. The method of claim 1 wherein the step of determining whether a vehicle impact has occurred further comprises determining whether acceleration in the direction of roll exceeds a predetermined acceleration value.

8. The method of claim 1 wherein the step of determining whether a vehicle impact has occurred further comprises determining whether velocity in the direction of roll exceeds a predetermined velocity value.

9. The method of claim 1 wherein the step of selecting the first threshold value is based on the roll angle and a yaw rate of the vehicle.

10. The method of claim 1 wherein the step of selecting the second threshold value is based on velocity or acceleration of the vehicle in the direction of roll.

11. A method of predicting a rollover of a motor vehicle, the vehicle including at least one sensor adapted to detect lateral acceleration and a roll rate of the vehicle, the method comprising:
determining a first value indicative of a vehicle roll rate and a second value indicative of lateral acceleration of the vehicle;
determining whether the first and second values are within predetermined ranges;
determining a vehicle roll angle based on the first value when the first and second values are not within the predetermined ranges;
selecting a first threshold value based on the vehicle roll angle;
determining whether a vehicle impact event has occurred;
selecting a second threshold value if a vehicle impact has not occurred;
comparing a first signal indicative of motion of the vehicle to the first threshold value; and
comparing a second signal indicative of kinetic energy of the vehicle to a second threshold value;
wherein a rollover is predicted when a vehicle impact has not occurred and the first and second signals exceed the first and second threshold values, respectively.

12. The method of claim 11 further comprising the step of controlling a vehicle safety system when a vehicle rollover is predicted.

13. The method of claim 11 wherein the step of determining whether a vehicle impact has occurred further comprises determining whether the lateral acceleration exceeds a predetermined lateral acceleration value.

14. The method of claim 13 wherein the step of determining whether a vehicle impact has occurred further comprises determining whether longitudinal acceleration in a direction perpendicular to the lateral acceleration exceeds a predetermined longitudinal acceleration value.

15. The method of claim 14 wherein the vehicle further comprises an impact sensor and the step of determining whether a vehicle impact has occurred further comprises determining whether pressure detected by the impact sensor exceeds a predetermined pressure value.

16. A system for predicting a roll condition of a motor vehicle, the system comprising:
a first sensor for generating a roll angle signal;
a second sensor for generating a lateral acceleration signal;
a third sensor for generating a longitudinal acceleration signal;
a controller configured to receive signals from the first, second, and third sensors and control operation of a vehicle safety system, the controller selecting first threshold value based on the roll angle signal and selecting a second threshold value based on the lateral or longitudinal acceleration signals, the controller indicating the roll condition when the lateral and longitudinal acceleration signals do not indicate a vehicle impact and the lateral acceleration signal exceeds the first and second threshold values.

17. The system of claim 16 wherein the roll angle sensor comprises a roll rate sensor from which the roll angle signal is derived.

18. The system of claim 16 wherein the vehicle safety system is an air bag.

19. The system of claim 16 wherein the vehicle safety system is an inflatable knee bolster.

20. The system of claim 16 further comprising a fourth sensor for providing a vertical acceleration signal to the controller, the controller confirming the roll condition based on the vertical acceleration signal.

* * * * *